US012327937B2

(12) United States Patent
Zweers

(10) Patent No.: US 12,327,937 B2
(45) Date of Patent: Jun. 10, 2025

(54) ANTENNA ASSEMBLIES AND ANTENNA MODULES FOR USE IN WIRELESS COMMUNICATION SYSTEMS

(71) Applicant: Qorvo US, Inc., Greensboro, NC (US)

(72) Inventor: Jan-Willem Zweers, Nieuwleusen (NL)

(73) Assignee: Qorvo US, Inc., Greensboro, NC (US)

( * ) Notice: Subject to any disclaimer, the term of this patent is extended or adjusted under 35 U.S.C. 154(b) by 187 days.

(21) Appl. No.: 18/175,943

(22) Filed: Feb. 28, 2023

(65) Prior Publication Data

US 2023/0402759 A1 Dec. 14, 2023

Related U.S. Application Data

(60) Provisional application No. 63/358,941, filed on Jul. 7, 2022, provisional application No. 63/350,062, filed on Jun. 8, 2022.

(51) Int. Cl.
*H01Q 9/27* (2006.01)
*H01Q 1/36* (2006.01)

(52) U.S. Cl.
CPC ................ *H01Q 9/27* (2013.01); *H01Q 1/36* (2013.01)

(58) Field of Classification Search
None
See application file for complete search history.

(56) References Cited

U.S. PATENT DOCUMENTS

2001/0048399 A1* 12/2001 Oberschmidt ....... H01Q 13/106 343/895
2007/0109194 A1 5/2007 Biddulph
2013/0093641 A1* 4/2013 Ng ......................... H01Q 21/28 343/841

FOREIGN PATENT DOCUMENTS

JP 2006086739 A * 3/2006

OTHER PUBLICATIONS

Nikolaou, S. et al., "Antennas for UWB Applications," UWB Technology—Circuits and Systems, Jun. 2019, available on the Internet: [URL: https://www.intechopen.com/chapters/67842], 18 pages.
Extended European Search Report for European Patent Application No. 23175781.6, mailed Oct. 16, 2023, 28 pages.

* cited by examiner

*Primary Examiner* — Dameon E Levi
*Assistant Examiner* — Anh N Ho
(74) *Attorney, Agent, or Firm* — Withrow & Terranova, P.L.L.C.

(57) ABSTRACT

A wireless communication system comprising one or more cross polarized antenna assemblies with optimized propagation delay that form part of an antenna module having two dominant perpendicular polarizations. Isolation or crosstalk in each antenna module is minimized through an implementation of a sectorized planar isolation and correlation enhancer in the form of a ground plane opening structure.

25 Claims, 16 Drawing Sheets

ANTENNA ASSEMBLIES AND ANTENNA MODULES FOR USE IN WIRELESS COMMUNICATION SYSTEMS

RELATED APPLICATIONS

This application claims the benefit of provisional patent application Ser. No. 63/350,062, filed Jun. 8, 2022, and provisional patent application Ser. No. 63/358,941, filed Jul. 7, 2022, the disclosures of which are incorporated herein by reference in their entireties.

FIELD OF THE DISCLOSURE

The present disclosure relates to antenna assemblies and antenna modules for use in wireless communication systems.

BACKGROUND

Typically, charging an electric vehicle (EV) using a wireless charging technology requires the electric vehicle to be positioned and most accurately aligned over a ground-plane charging pad (GPCP). A wireless charging technology with such degree of accuracy requires a wireless communication system to establish a reliable wireless communication network between the GPCP and the EV capable of identifying a position of an EV in reference to a GPCP.

Therefore, it is desirable to develop an antenna assembly to form part of an antenna module coupled to a control unit as part of a wireless communication system optimized to operate at two dominant perpendicular polarizations with low output correlation, low cross-polarization, and high gain while transmitting and/or receiving ultra-wide band (UWB) signals used to determine a distance and direction of EV from the GPCP.

SUMMARY

In view of this, embodiments of the present disclosure provide an antenna assembly to form part of an antenna module coupled to a control unit as part of a wireless communication system, to solve the technical problem associated with the prior art.

In a first aspect, an embodiment of this disclosure provides an antenna assembly comprising an elongated central segment along a first axis, having a first end and a second end, a first spiral segment that extends outward from the first end, back toward the second end, and at least partially inward along the elongated central segment, a second spiral segment that extends outward from the second end, back toward the first end, and at least partially inward along the elongated central segment. According to the same embodiment, each of the elongated central segment, the first spiral segment, and the second spiral segment are electrically conductive and form an antenna element. In an embodiment, the elongated central segment, the first spiral segment, and the second spiral segment reside in a first plane. In yet another embodiment, the first spiral segment, and the second spiral segment are on opposite sides of the elongated central segment. The antenna assembly further comprises an antenna substrate on and/or in which the antenna element resides, wherein the antenna substrate comprises of a dielectric material. According to an embodiment, the antenna assembly comprises a connection member connected to and extending from the elongated central segment, wherein the connection member is electrically conductive.

In a second aspect, an embodiment of the present disclosure provides an antenna module comprising a ground plane assembly which further comprises a ground plane having a top surface and a bottom surface. The antenna module further comprises a plurality of antenna assemblies disposed over a top surface of the ground plane, each antenna assembly comprising an elongated central segment along a first axis having a first end and a second end, a first spiral segment that extends outward from the first end, back toward the second end, and at least partially inward along the elongated central segment, a second spiral segment that extends outward from the second end, back toward the first end, and at least partially inward along the elongated central segment. Each of the elongated central segment, the first spiral segment, and the second spiral segment are electrically conductive and form an antenna element.

According to an embodiment, the antenna module further comprising a plurality of central openings in the ground plane, wherein each central opening is an elongated opening having a first end and a second end, and wherein the plurality of central openings form part of a ground plane opening structure. In yet another embodiment, the plurality of antenna assemblies comprise three antenna assemblies disposed radially at equal distances and equally distributed angles equal to 120 degrees around a point on the ground plane assembly. According to an embodiment, the ground plane assembly is circular and wherein the point on the ground plane assembly is a central point of the ground plane assembly. The ground plane opening structure comprises three central openings extending radially outward at equal lengths and equally distributed angles equal to 120 degrees from the, each of three central openings having a first end intersecting at the central point and a second end extending in between adjacent pairs of the plurality of antenna assemblies forming a "Y" shape in the ground plane.

In an embodiment, the ground plane opening structure further comprises nine sub-central openings, wherein each three of nine sub-central openings extend radially outward at equally distributed angles equal to 120 degrees from a point on a bisector of the angle formed between one of three adjacent pairs of central openings having two of the three sub-central openings extending parallel to the adjacent pair of central openings and one of the three sub-central openings extending and connecting to the central point. The ground plane opening structure may further comprise three outer openings, wherein each outer opening is an elongated opening in the ground plane parallel to one of three antenna assemblies and in opposite side of the antenna assembly in relation to the central point. The ground plane opening structure may further comprise one or more loads coupled to the ground plane opening structure.

In an embodiment, each of the plurality of antenna assemblies are the same as one another. Each of the plurality of antenna assemblies are substantially perpendicular to the ground plane assembly. The antenna module further comprises an antenna substrate on or in which the antenna element resides, wherein the antenna substrate comprises of a dielectric material. The ground plane assembly further comprises a ground plane substrate on or in which the ground plane resides. The ground plane substrate forms part of a bottom surface of the ground plane opening structure.

According to an embodiment, the first spiral segment, and the second spiral segment are on opposite sides of the elongated central segment. The elongated central segment, the first spiral segment, and the second spiral segment reside in a first plane. The ground plane assembly further comprises a plurality of thru holes. Each of the three antenna assemblies further comprise a connection member connected to and extending from the elongated central segment, wherein the connection member is electrically conductive and is inserted into each one of respective thru holes. The ground plane assembly is planar and resides in a second plane. The operating frequency of the antenna module may be in a range between 5 and 20 GHz.

In a third aspect, an embodiment of the present disclosure provides a wireless communication system comprising a control unit and an antenna module associated with the control unit. The antenna module comprises a ground plane assembly further comprising a ground plane having a top surface and a bottom surface. The antenna module further comprises a plurality of antenna assemblies disposed over a top surface of the ground plane, each antenna assembly comprising an elongated central segment along a first axis having a first end and a second end, a first spiral segment that extends outward from the first end, back toward the second end, and at least partially inward along the elongated central segment, a second spiral segment that extends outward from the second end, back toward the first end, and at least partially inward along the elongated central segment. Each of the elongated central segment, the first spiral segment, and the second spiral segment are electrically conductive and form an antenna element.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 2A:
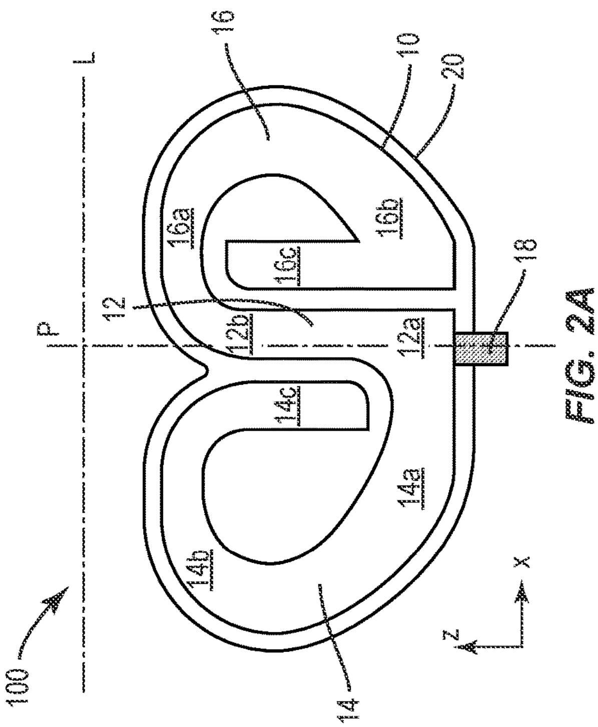
FIG. 2A shows an antenna assembly having a connection member extending from the elongated central segment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As used herein, the term "and/or" includes any and all combinations of one or more of the associated listed items. It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present.

As used herein, unless expressly stated otherwise, "connected" means that one component/feature is in direct physical contact with another component/feature. Likewise, unless expressly stated otherwise, "coupled" or "linked" or "bonded" means that one component/feature is directly or indirectly joined to (or directly or indirectly communicates with) another component/feature, and not necessarily directly physically connected. Thus, although the figures may depict example arrangements of elements, additional intervening elements, devices, features, or components may be present in an actual embodiment.

Relative terms such as "below" or "above" or "upper" or "lower" or "horizontal" or "vertical" may be used herein to describe a relationship of one element, layer, or region to another element, layer, or region as illustrated in the Figures.

It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The term "electromagnetic field" refers to an electric field, a magnetic field, or a combination thereof. More particularly, an electromagnetic field describes the strength of force interaction between stationary charged objects or moving charged objects at a distance. For example, an electromagnetic field can be employed to describe the interaction of antennas and/or other bodies in radio communications. Electromagnetic fields can be either constant or time varying.

Further, in the following description, a direction is sometimes described using terms of a X-axis direction, a Y-axis direction, and a Z-axis direction. The X-axis direction, the Y-axis direction, and the Z-axis direction are orthogonal to each other. Further, in the following description, "as viewed in top plane" signifies that an object in question is viewed from the Z-axis direction while the descriptions "as viewed from the front" or "front view" signify that an object in question is viewed from the Y-axis direction.

Further, in the present disclosure, the term "same", "substantially similar" or "substantially equal" does not refer to an object that is identical but one that is "substantially the same". "Substantially the same" as an object, for example, may refer to another object in which a difference between the two remains within a range of a manufacturing error.

It is to be understood that the features of the various exemplary embodiments described herein may be combined with each other, unless specifically noted otherwise. Specific embodiments described herein are merely illustrative of the present application and are not intended to limit the present application. This application is intended to cover any alternatives, modifications, equivalents, and alternatives that may be included within the spirit and scope of the application as defined by the specification and the appended claims.

Figure 1:
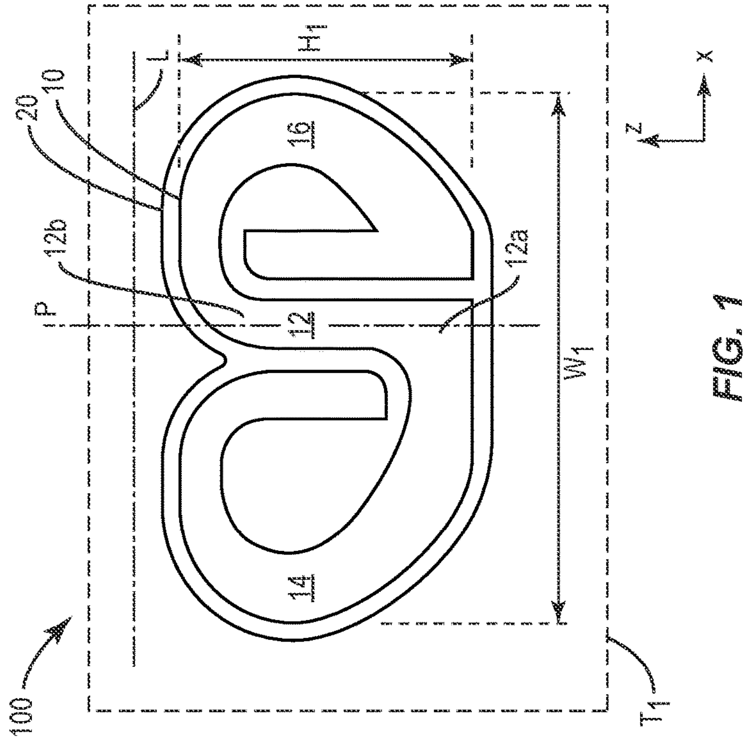
FIG. 1 illustrates a front-view of an exemplary antenna assembly according to an embodiment of the present disclosure.

FIG. 1 illustrates a front-view of an exemplary antenna assembly 100 according to an embodiment of the present disclosure. The antenna assembly 100 comprises an antenna element 10 residing in and/or on an antenna substrate 20. According to an embodiment, the antenna substrate 20 may provide mechanical support and/or electrical isolation to the antenna element 10.

The antenna substrate 20 may be one or more of printed circuit board material, integrated circuit package substrates, and/or a non-conductive fabricated antenna backing structure including a dielectric material or any other suitable insulating layers such as FR-4.

The antenna element 10 comprises an elongated central segment 12 extending along a first axis P and having a first end 12*a* and a second end 12*b*, a first spiral segment 14, and a second spiral segment 16. The elongated central segment 12, the first spiral segment 14, and the second spiral segment 16 are conductive and form parts of a unitary piece which resides in a first plane $T_1$. According to an embodiment, a height $H_1$ of the antenna element 10 along the first axis P is in the range of 7 mm to 13 mm. In yet another embodiment, a width W1 of the antenna element 10 along an axis L in the first plane $T_1$ and perpendicular to the first axis P is in the range of 6 to 15.

FIG. 2A shows an exemplary embodiment of the antenna assembly 100 with a connection member 18. According to an embodiment, the first spiral segment 14 further comprises a first section 14*a* extending outward from the first end 12*a* of the elongated central segment 12, a second section 14*b* extending back toward the second end 12*b* of the elongated central segment 12, and a third section 14*c* extending inward and at least partially along the elongated central segment 12. In the same embodiment, the second spiral segment 16 further comprises a fourth section 16*a* extending outward from the second end 12*b* of the elongated central segment 12, a fifth section 16*b* extending back toward the first end 12*a* of the elongated central segment 12, and a sixth section 16*c* extending inward and at least partially along the elongated central segment 12.

According to an embodiment, the first spiral segment 14 and the second spiral segment 16 are on opposite sides of the elongated central segment 12. In an embodiment, a thickness of the antenna element 10 along its structural plane may be uniform or non-uniform and in the range of 0.1 mm to 2 mm. According to an embodiment, a width of each segment and section of the antenna element 10 along an axis L perpendicular to axis P may be either uniform or non-uniform along their structural geometry and in accordance with Table 1.

TABLE 1

| Section or Segment | Width Range (mm) |
|---|---|
| $W_{12}$ | 0.5-2 |
| $W_{14}$ | 0.5-2 |
| $W_{14a}$ | 0.5-2 |
| $W_{14b}$ | 0.5-2 |
| $W_{14c}$ | 0.5-2 |
| $W_{16}$ | 0.5-2 |
| $W_{16a}$ | 0.5-2 |
| $W_{16b}$ | 0.5-2 |
| $W_{16c}$ | 0.5-2 |

It is noted that while FIG. 2A depicts the antenna assembly 100 as a singular unit, dimension of each segment and section of the antenna element 10 residing in and/or on the antenna substrate 20 may impact the operation frequency of the antenna assembly 100 which is in the range of 6 GHz to 12 GHZ and beyond.

Figure 2B:
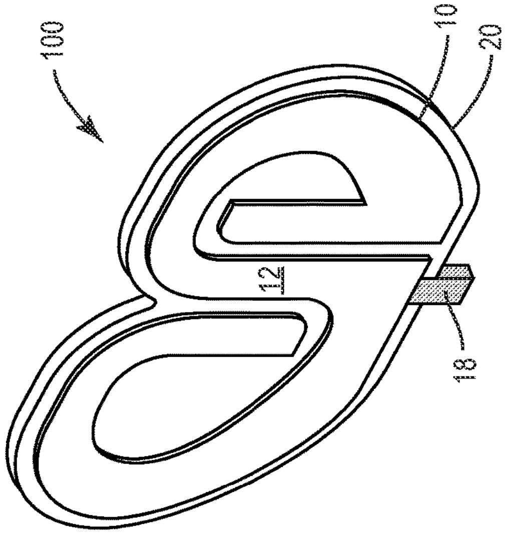
FIG. 2B shows an isometric view of an exemplary antenna assembly.

FIG. 2B shows an isometric view of the antenna assembly 100 having a connection member 18. The connection member 18 is electrically conductive and mechanically connects to and extends from the elongated central segment 12 of the antenna element 10. In an embodiment, the connection member 18 provides mechanical support to the antenna assembly 100. In yet another embodiment, the connection member 18 is configured to provide the antenna element 10 residing in and/or on an antenna substrate 20 with an electrical connection path to at least one of a signal feed line and a control unit (not shown).

Figure 3:
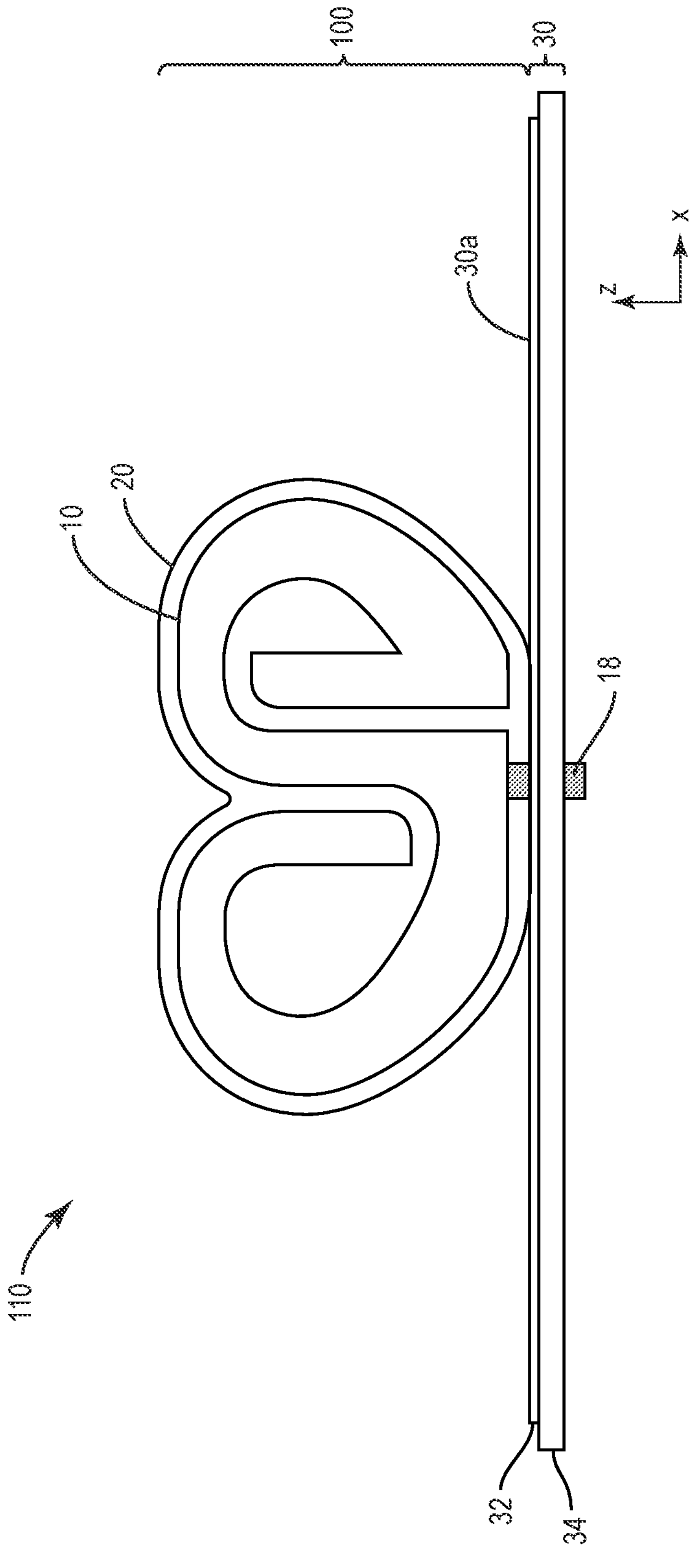
FIG. 3 shows an exemplary antenna module according to an embodiment of the present disclosure.

FIG. 3 shows an exemplary antenna module 110 according to an embodiment of the present disclosure. The antenna module 110 comprises the antenna assembly 100 disposed over a top surface 30*a* of a ground plane assembly 30. The antenna assembly 100 is substantially similar to the antenna assembly 100 as described in FIG. 1 and FIGS. 2A and 2B and have similar references as those discussed.

Referring now back to FIG. 3, the antenna assembly 100 comprises the antenna element 10 and the antenna substrate 20. The ground plane assembly 30 comprises a ground plane 32 residing in and/or on a ground plane substrate 34. According to an embodiment, the connection member 18 inserts through the ground plane assembly 30 and provides mechanical support to the antenna assembly 100 and serves to mechanically hold the antenna assembly 100 above the ground plane assembly 30. According to yet another embodiment, the connection member 18 is further configured to electrically connect the antenna element 10 to at least one of a signal feed line and a control unit (not shown). The connection member 18 and therefore the antenna element are electrically isolated from the ground plane 32 which may not necessarily be the "earth ground." The ground plane 32 may provide an electromagnetic reference to the antenna element 10. The ground plane 32 serves as a reflector to electromagnetic waves emitted by the antenna element 10.

Figure 4:
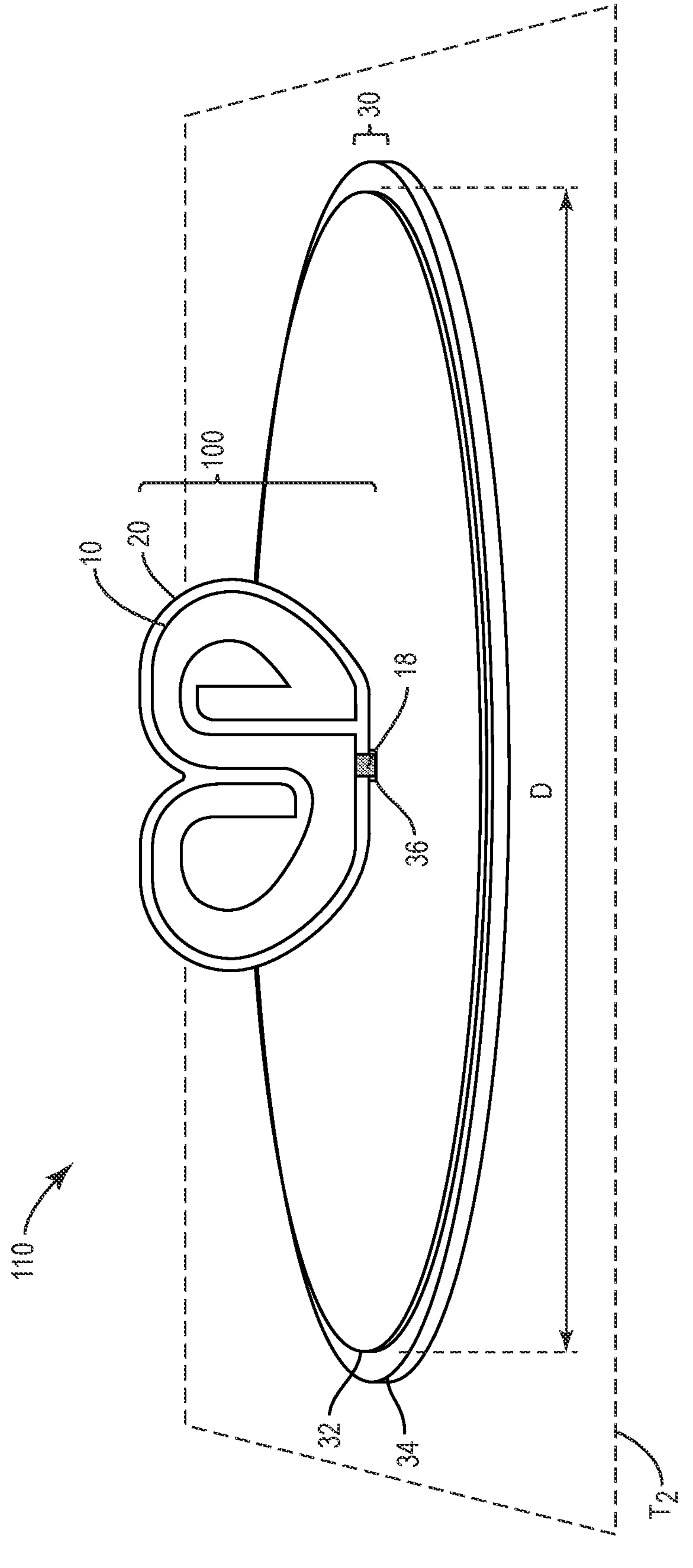
FIG. 4 shows an exemplary view of an antenna module with a thru hole forming part of ground plane assembly.

FIG. 4 shows an exemplary view of the antenna module 110 having a thru hole 36 in the ground plane assembly 30. According to an embodiment, the thru hole 36 comprises a hole extending vertically in the ground plane assembly forming a top surface opening over a top surface of the ground plane 32 and a bottom surface opening (not shown) over a bottom surface 30*b* of the ground plane assembly 30. In The ground plane assembly 30 may be planar in the second plane $T_2$.

The connection member 18 may enter the thru hole 36 from the top surface opening, passes through an electrically isolated channel in the ground plane assembly 30 and exits from the bottom surface opening (not shown) providing the connection member 18 and the antenna element 10 with a connection path to at least one of a signal feed line and a control unit (not shown) over a bottom surface of the ground plane assembly 30 and opposite to the surface wherein the antenna assembly 100 resides. As previously indicated, the thru hole 36 electrically isolates the connection member 18 and therefore the antenna element 10 from the ground plane 32. In an embodiment, the thru hole 36 further provides mechanical support to hold the antenna assembly 100 in a desired orientation over the top surface 30*a* of the ground plane assembly 30. The ground plane 32 may be circular with a diameter D in the range of 20 mm to and beyond. In an embodiment, a thickness of the ground plane 32 along its structural plane may be uniform or non-uniform and in the range of 0.001 mm to 0.5 mm. In certain embodiments, impedance matching and radiation diagram of the antenna module 110 is a function of the size of the ground plane 32.

Figure 5:
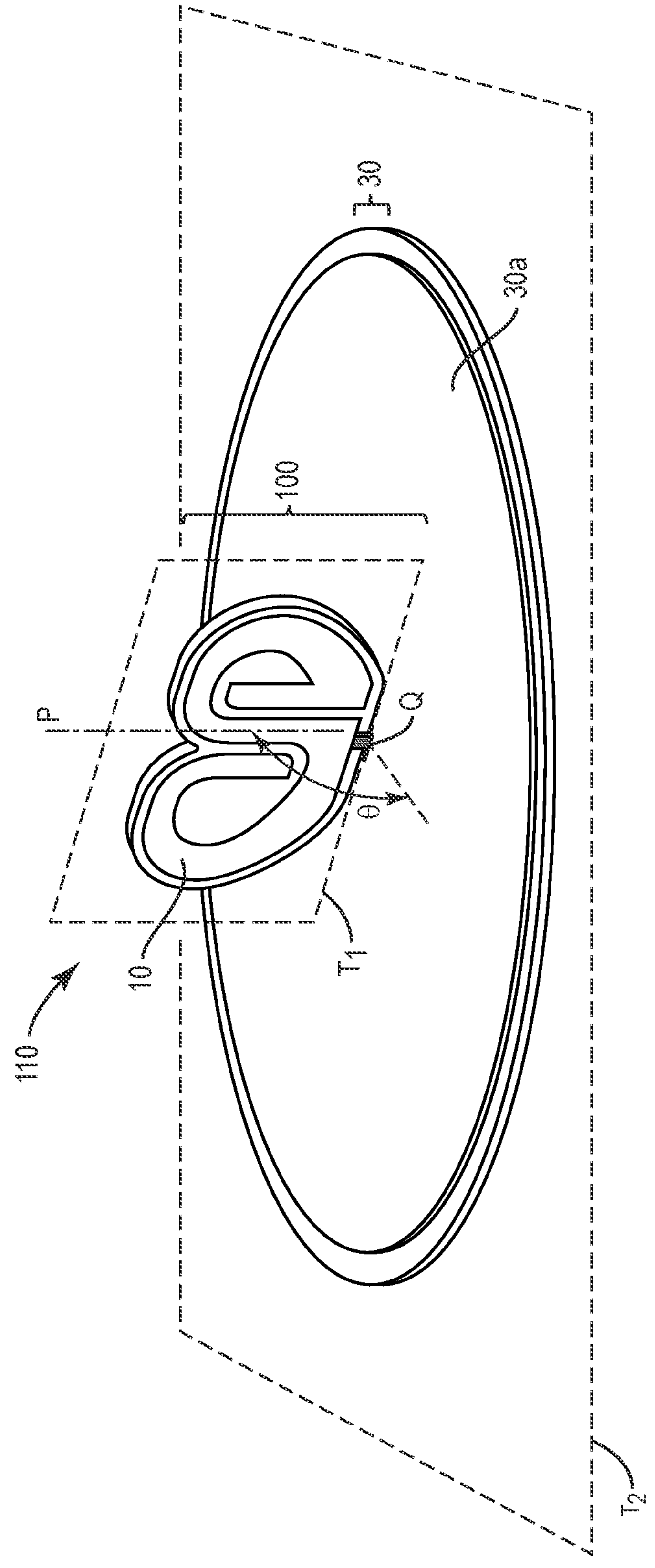
FIG. 5 shows an exemplary embodiment of an antenna module.

FIG. 5 shows an exemplary embodiment of the antenna module 110 comprising the antenna assembly 100 disposed over the top surface 30*a* of the ground plane assembly 30. The antenna assembly 100 is planar in a first plane $T_1$ and having a first axis P. The ground plane assembly 30 is planar in a second plane $T_2$. The antenna assembly 100 may be disposed over the ground plane assembly 30 at a point Q on the top surface 30*a* of the ground plane assembly 30.

The antenna assembly 100 may be oriented such that the antenna element 10 faces toward a first side of the second plane $T_2$ from the point Q on the top surface 30*a* of the ground plane assembly 30. An angle $\theta$ is determined at the point Q and between the first axis P of the first plane $T_1$ relative to the first side of the second plane $T_2$. The antenna assembly 100 forms a non-zero angle $\theta$ in the range of 45 to 180 degrees with the ground plane assembly 30. In certain embodiments, the performance of antenna module 110 is a function of angle $\theta$.

Figure 6:
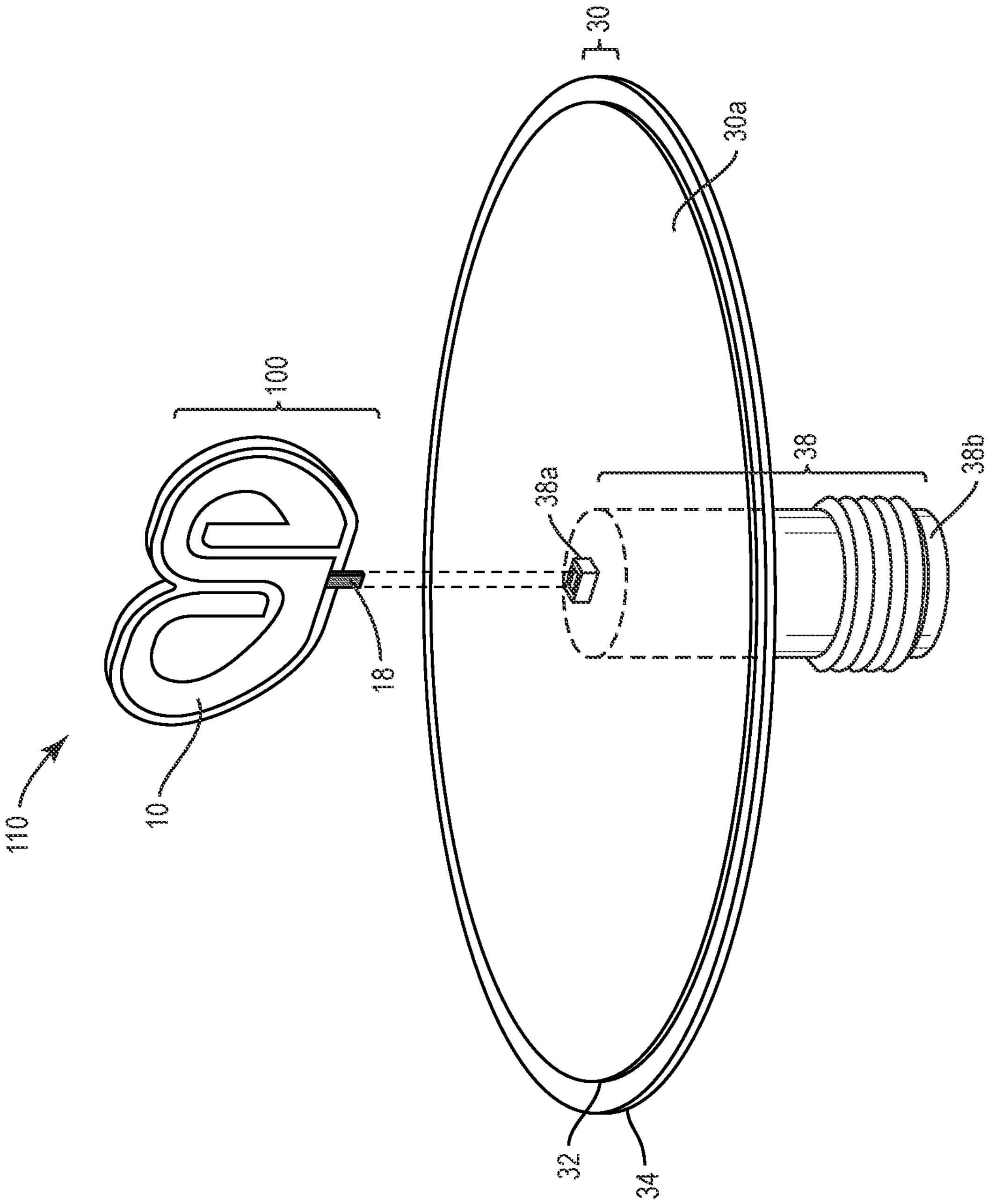
FIG. 6 shows an exemplary embodiment of an antenna module having a connection terminal forming part of ground plane assembly.

FIG. 6 shows an exemplary embodiment of the antenna module 110 having a connection terminal 38 forming part of the ground plane assembly 30. The connection terminal 38 comprises a first port 38*a* over the top surface 30*a* of the ground plane assembly 30 that shares one or more connection paths with a second port 38*b* over a bottom surface of the ground plane assembly 30. In an embodiment, the first port 38*a* is configured to structurally hold the antenna assembly 100 over the top surface 30*a* of the ground plane assembly 30 and to provide the connection member 18 and therefore the antenna element 10 with a first connection path to the second port 38*b*.

The second port 38*b* may be configured to provide the first port 38*a* with a first connection path to the connection member 18 and a second connection path to the ground plane 32 wherein the first connection path and the second connection path are isolated from one another. According to another embodiment, the first port 38*a* electrically isolates the connection member 18 and therefore the antenna element 10 from the ground plane 32. In an embodiment, the second port 38*b* provides an interface for connecting one of a single or multi-line signal feed lines to the antenna module 110 (not shown).

Figure 7A:
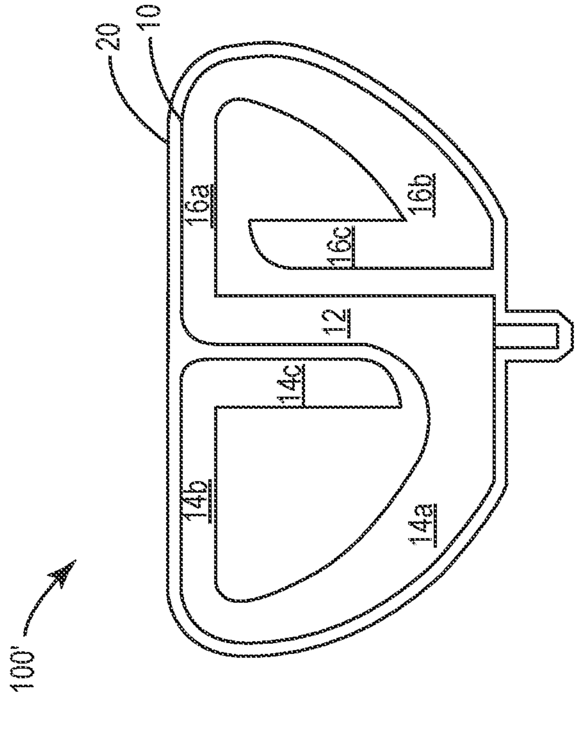
FIGS. 7A and 7B show schematic representations of other exemplary embodiments of an antenna assembly in accordance with the disclosure.
Figure 7B:
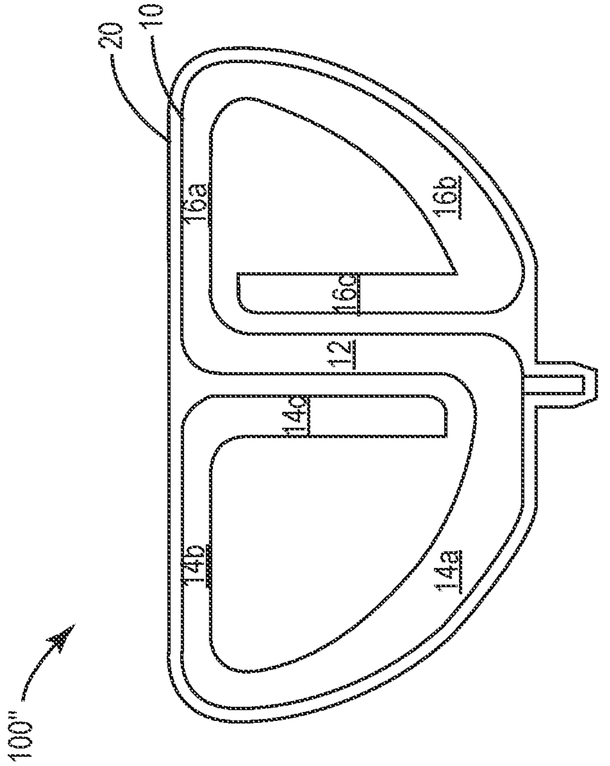

FIGS. 7A and 7B illustrate two exemplary embodiments of the antenna assembly 100. It is noted that each of the antenna assemblies 100' and 100" as shown in FIGS. 7A and 7B respectively comprise elements that were previously described in reference to the antenna assembly 100 as shown in FIG. 1 and FIGS. 2A and 2B. Therefore, they will continue to have the same reference numerals. Nevertheless, according to various embodiments of the present disclosure, the antenna assemblies 100' and 100" may differ from antenna assembly 100 in at least one of the values associated with a height $H_1$ and/or a width $W_1$ as previously described with reference to FIG. 1.

Antenna assemblies 100' and 100" each comprising an antenna element 10 residing on and/or in the antenna substrate 20 may differ from the antenna assembly 100 in at least one of the value ranges associated with a width of a segment or a section of the antenna element 10 including value ranges for the non-uniform width of the elongated central segment 12, the first section 14*a*, the second section 14*b*, the third section 14*c*, the fourth section 16*a*, the fifth section 16*b*, and the sixth section 16*c* as parameterized by $W_{12}$, $W_{14a}$, $W_{14b}$, $W_{14c}$, $W_{16a}$, $W_{16b}$, $W_{16c}$.

Figure 8A:
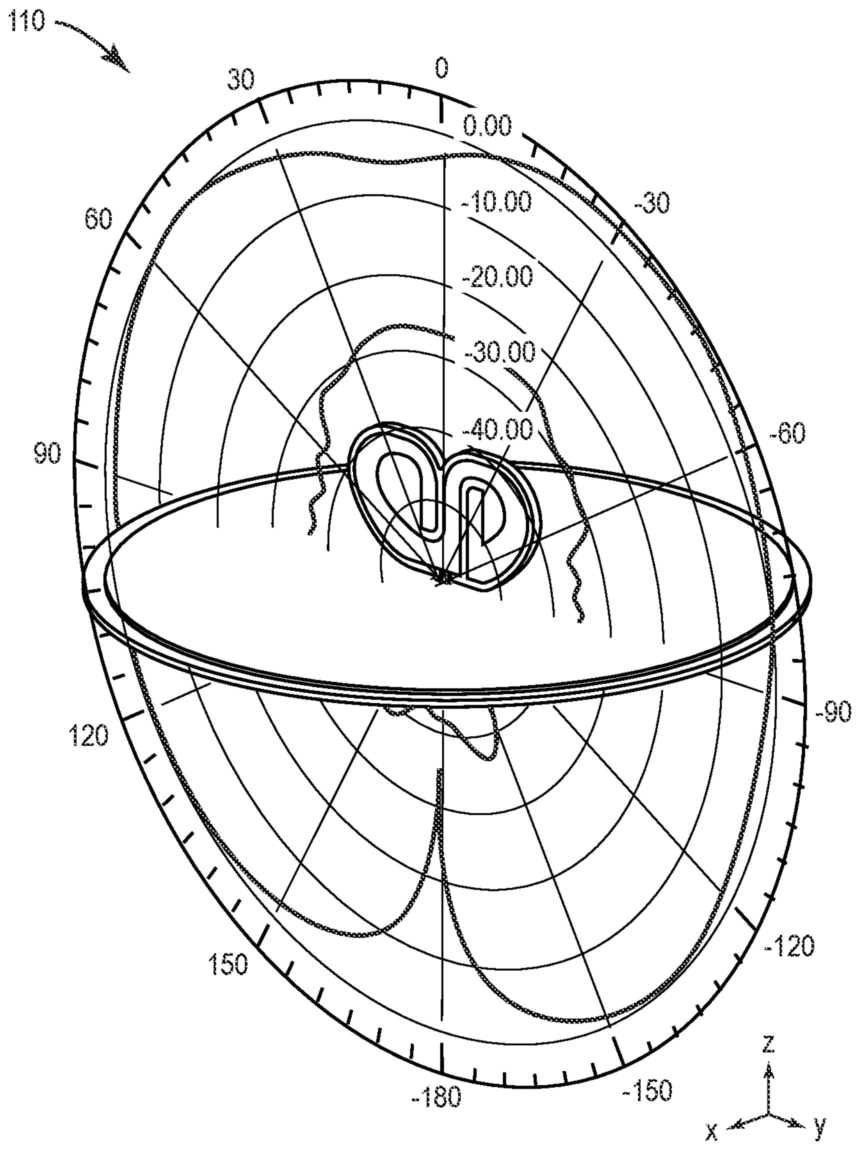
FIGS. 8A and 8B illustrate radiation patterns of an antenna module designed according to an embodiment of the present disclosure.
Figure 8B:
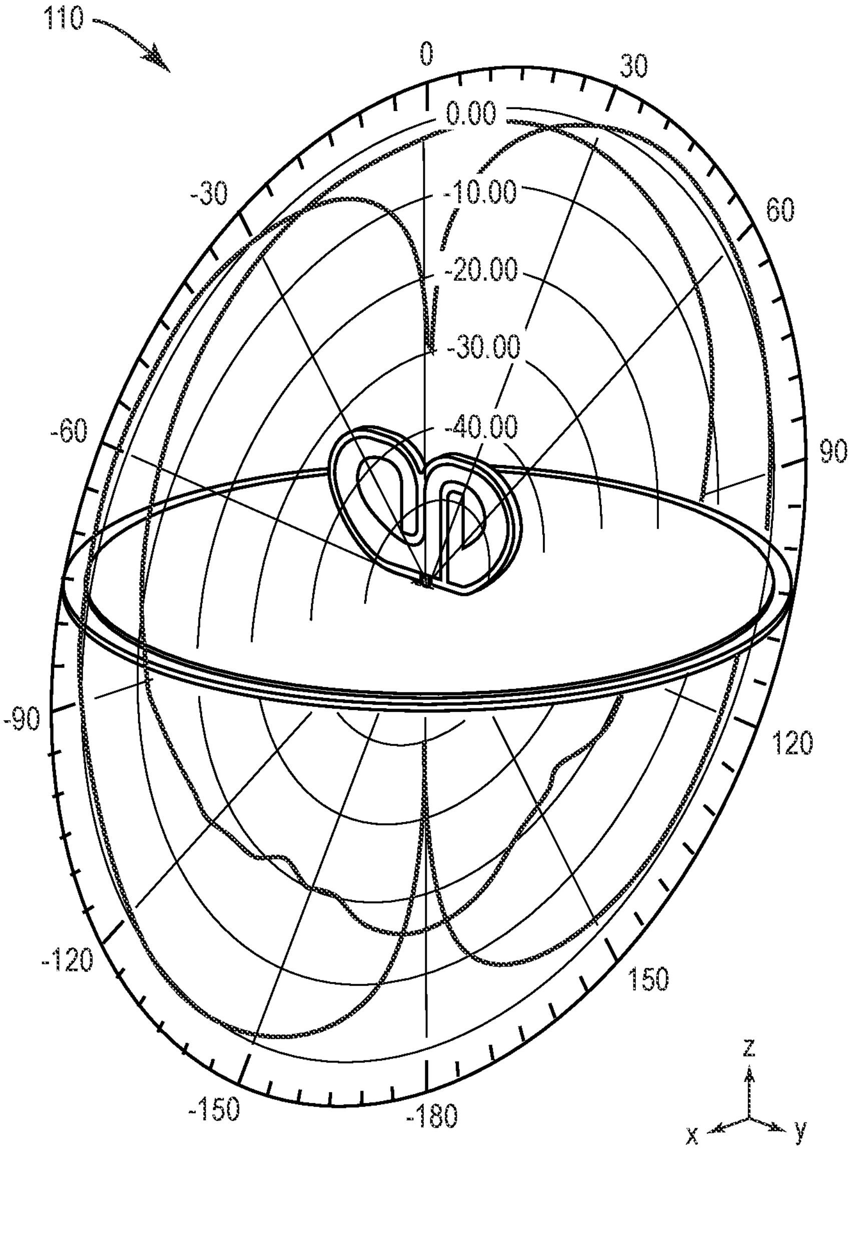

FIGS. 8A and 8B illustrate radiation patterns of the antenna module 110 designed according to an embodiment of the present disclosure. As shown in FIGS. 8A and 8B the radiation pattern of antenna module 110 is both omnidirectional and hemi-spherical. The structural design, geometry, and dimensions associated with various parts of the antenna module 110 introduces a second dominant polarization perpendicular to the first dominant polarization. The second dominant polarization may increase the output gain of the antenna module 110 and lower any output correlation associated with the antenna module 110 which would make it a good candidate for applications requiring wider bandwidth, low cross-polarization and higher isolation.

Figure 9:
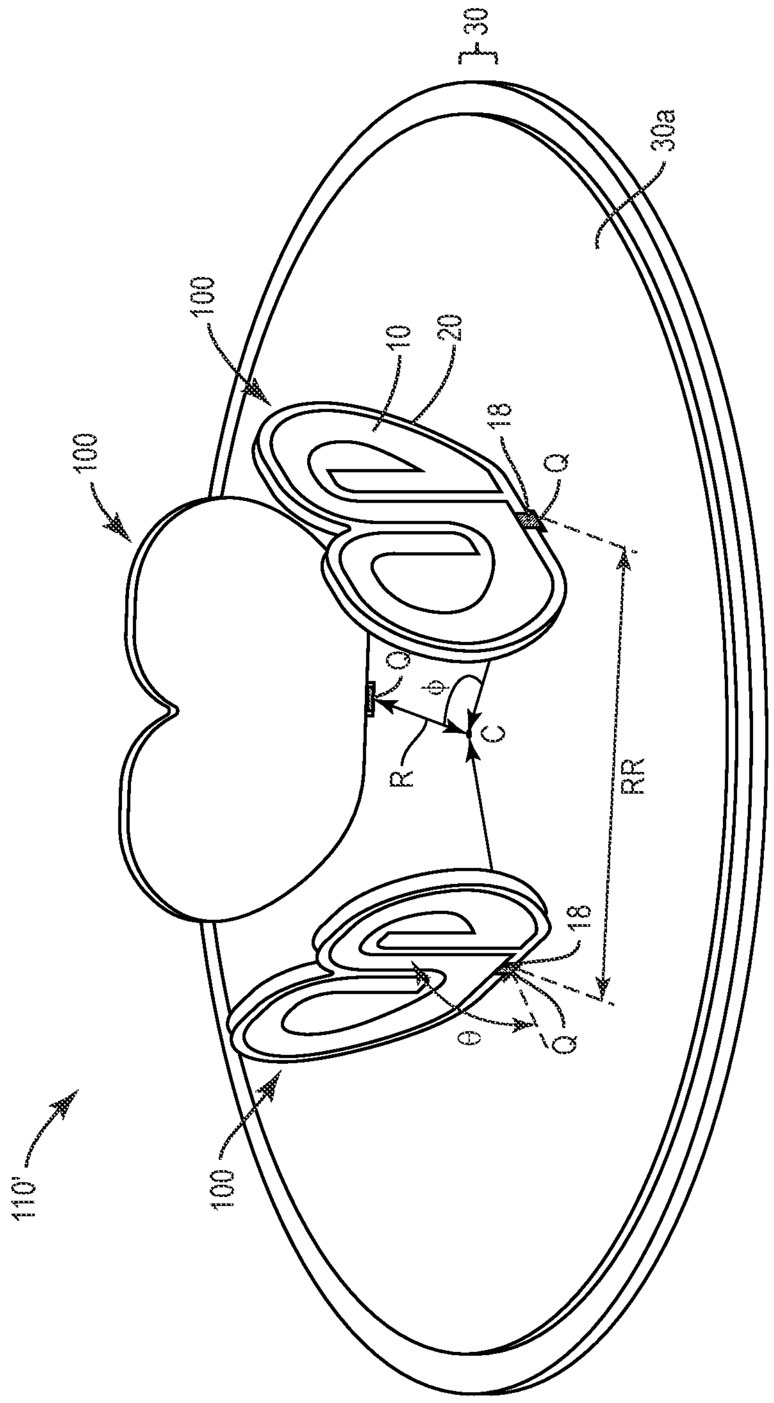
FIG. 9 illustrates an exemplary embodiment of an antenna module comprising three substantially similar antenna assemblies.

FIG. 9 illustrates an exemplary embodiment of an antenna module 110' comprising three substantially similar antenna assemblies 100 disposed over the top surface 30*a* of the ground plane assembly 30. All of the three antenna assemblies 100 as shown in FIG. 9 are substantially similar to the antenna assembly 100 described in reference to FIG. 1 and FIGS. 2A and 2B and will continue to have same reference numerals as those discussed. The ground plane assembly 30 is substantially similar to the ground plane assembly 30 described in reference to FIGS. 3 to 6. All elements as shown in FIG. 9 with respect to the ground plane assembly 30 that were previously described in reference to FIGS. 3 to 6 will continue to have the same reference numerals as those discussed.

Although only the three antenna assemblies 100 are shown in FIG. 9, according to various other embodiments of the present disclosure, the same design is applicable to any number of a plurality of antenna assemblies 100 disposed over the top surface 30*a* of the ground plane assembly 30 to form an antenna module 110'. Since all of the three antenna assemblies 100 as shown in FIG. 9 are substantially similar to one another (with elements that bear the same reference numerals), only one of the three antenna assemblies 100 is described in FIG. 9 for the simplicity of disclosure.

Referring now to FIG. 9, each of the antenna assembly 100 comprises the connection member 18 that mechanically connects to and extends from the antenna element 10. The antenna element 10 resides on and/or in the antenna substrate 20 to form the antenna assembly 100. The connection member 18 is inserted through the ground plane assembly 30 at one of three imaginary points Q on the ground plane assembly 30. Points Q on the ground plane assembly 30 are arranged radially at equally distributed angle φ around an imaginary central point C on the ground plane assembly 30. Angle φ is substantially equal to 120 degrees. Points Q on the ground plane assembly 30 are distanced equally from the central point C. Each of the three points Q share a substantially equal distance R in the range of ¼ wavelength from the central point C. The distance RR between each of a two adjacent points Q are substantially equal and is in the range of ¼ wavelength (wavelength at highest frequency of use). According to an embodiment, each of the connection member 18 mechanical supports and holds the antenna assemblies 100 over a respective point Q on the ground plane assembly 30 in a spatial orientation such that the antenna element 10 of each antenna assembly 100 faces outwardly and in opposite direction to the central point C.

An angle θ forms at each of the three points Q on the ground plane assembly 30 and the antenna assembly 100 and the ground plane assembly 30. Referring now to the antenna module 110' as shown in FIG. 9, each of the three antenna assemblies 100 may form a non-zero angle θ in the range of 30 to 120 degrees with the ground plane assembly 30. According to an embodiment, each of the antenna assembly 100 may share a substantially equal angle θ with the ground plane assembly 30. All three of the antenna assemblies 100 may be substantially perpendicular to the ground plane assembly 30 having an angle in the range of 60 to 120 degrees.

Antenna module 110' is configured to function as an ultra-wideband and omni-directional radiating module. The antenna assembly 100 may be tuned to a different frequency or band, to the same frequency or band, or to some combination thereof.

Figure 10:
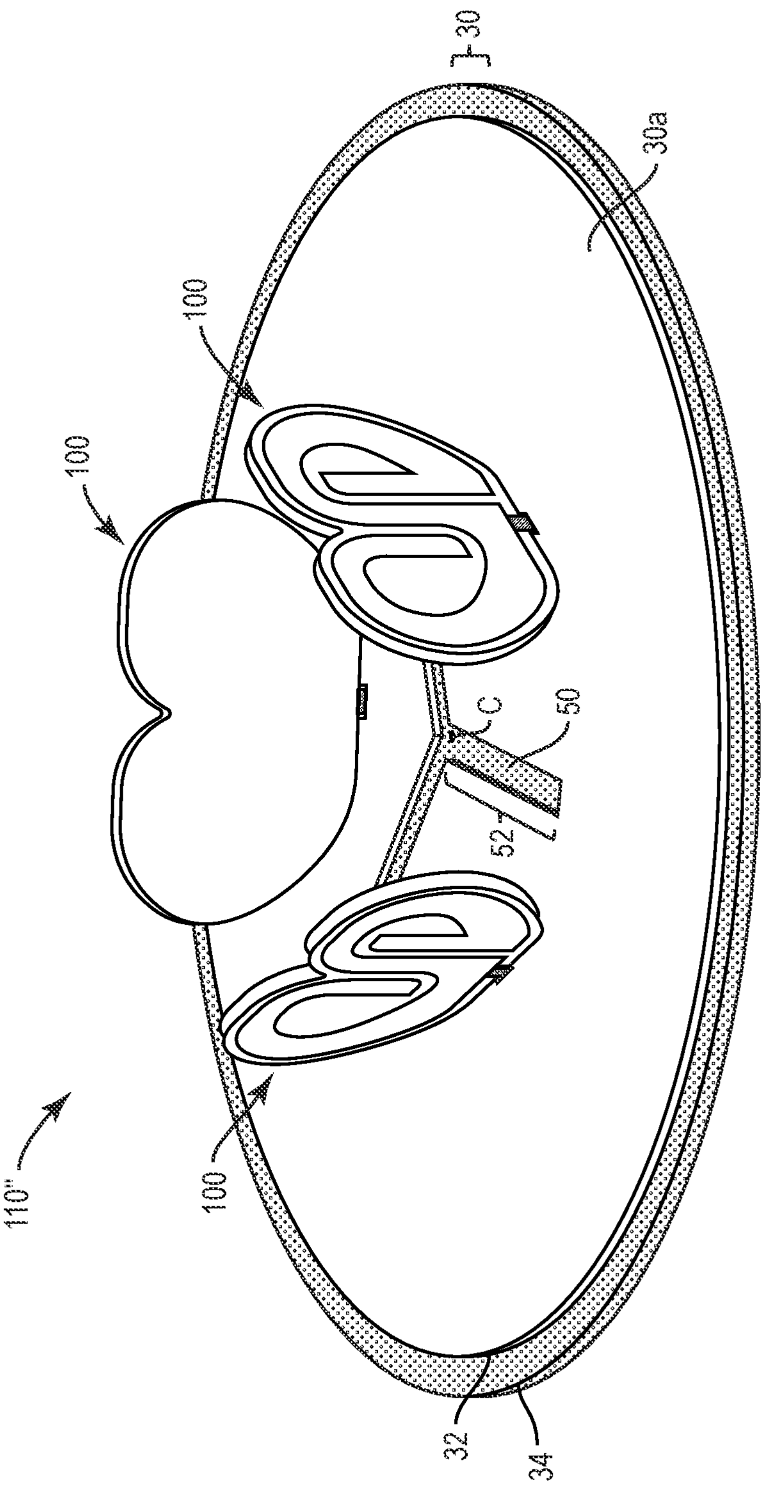
FIG. 10 illustrates an exemplary embodiment of an antenna module further comprising a ground plane opening structure.

FIG. 10 illustrates an exemplary embodiment of an antenna module 110" further comprising a ground plane opening structure 50. A structural size and geometrical dimension of the antenna module 110' as described in FIG. 9 is to be reduced. To reduce the structural size of the antenna module 110', the antenna assemblies 100 may be disposed closer to one another over the top surface 30*a* of the ground plane assembly 30. Nonetheless, unintended consequences such as polarization mismatch losses, propagation delay distortions, interference, or phase shifting of signals may arise. To overcome these limitations, a sectorized planar isolation and correlation enhancer in the form of the ground plane opening structure 50 is introduced. The ground plane opening structure 50 forms part of the antenna modules 110' to prevent any unintended signal interference and phase shifting in various technologies including but not limited to a multiple-input and multiple-output (MIMO) technology. A ground plane opening structure 50 forms part of the antenna modules 110' to reduce signal correlation, enhance signal isolation, and prevent any adverse effect of signal interference and phase shifting in determining the angle of arrival (AoA) of a signal by an antenna module 110'.

In an embodiment, three substantially similar central opening 52 are formed in the ground plane 32. Each central opening 52 is an elongated opening, such as a slot, that has a first end and a second end and extends radially outward at equally distributed angles from a central point C on the ground plane assembly 30. Together, the three central openings form a "Y" shape wherein adjacent pairs of the central openings 52 form an angle of 120 degrees. The ground plane substrate 34 may form a bottom surface of the central openings 52. A first end of each of the three central openings 52 intersect with one another over the central point C to form part of a unitary opening in the ground plane 32 configured to cancel the near-field impedance associated with the ground plane 32. Each of the three central openings 52 extends such that the second end of each of the three central openings 52 forms an opening, such as a slot, in between each of the two adjacent antenna assemblies 100.

Figure 11:
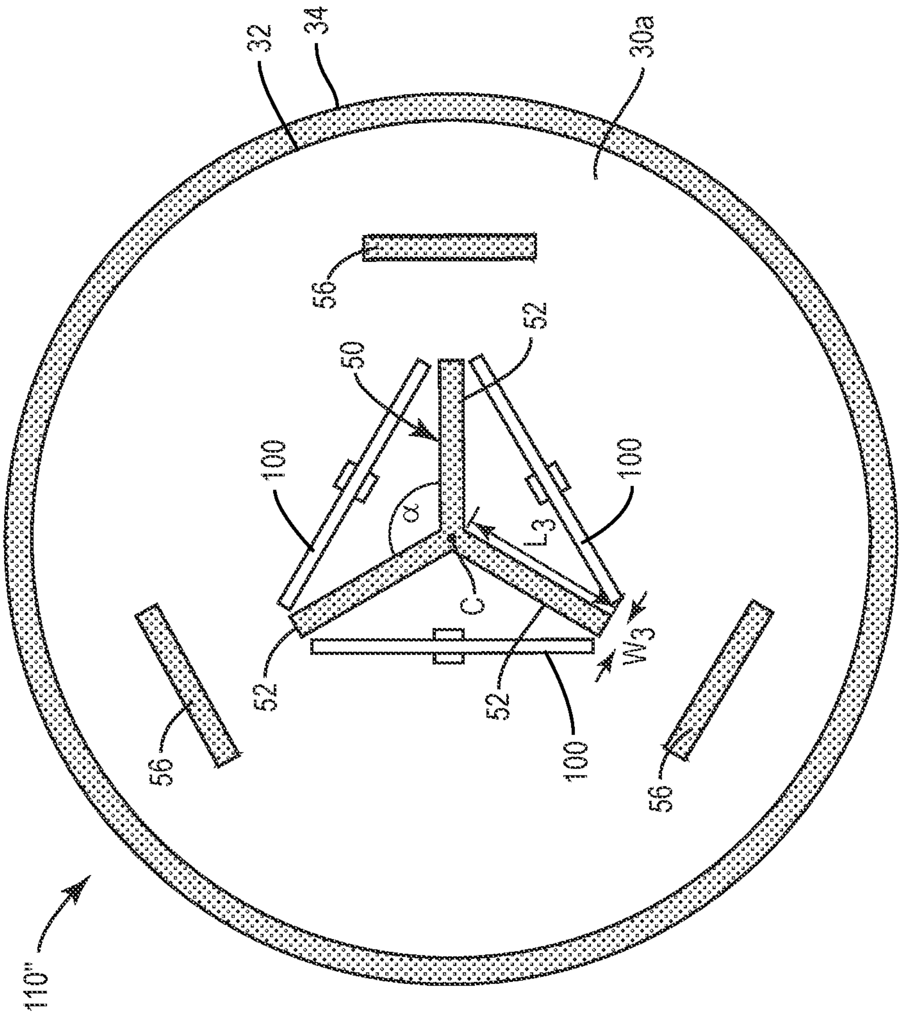
FIG. 11 illustrates a top view of the antenna module of FIG. 10 further comprising three secondary ground plane openings.

FIG. 11 is a top view of the antenna module 110' having the ground plane opening structure 50 as shown in FIG. 10 further comprising three outer openings 56. The three antenna assemblies 100 are disposed over the top surface of a ground plane 32 residing over the ground plane substrate 34. The structural shape and dimensions of each of the three central openings 52 may be adjusted to optimally tune the ground plane opening structure 50 to a desired center frequency of isolation. Opening portions of the ground plane opening structure 50 may be filled with a dielectric material (not shown) having a dielectric constant ∈ configured to further tune the ground plane opening structure 50 to a desired center frequency of isolation. In an embodiment, three outer openings 56 form part of the ground plane opening structure 50 such that each of the three outer opening 56 extends partially along one of three equidistant chords around the central point C and forms an opening, such as a slot, in the ground plane 32.

Outer openings 56 are elongated openings in the ground plane 32 parallel to one of a plurality of antenna assemblies 100 and in opposite side of the one of a plurality of antenna assemblies 100 in relation to the point C. Outer openings 56 are formed such that imaginary lines extending along each central opening 52 in the plane $T_2$ of the ground plane assembly 30 and passing through areas in between adjacent pairs of the antenna assemblies 100 are perpendicular bisector relative to outer openings 56. Each outer opening 56 may be coupled to one of the three central openings 52 to further tune the isolation frequency. The central openings 52 may be rectangular having a length $L_3$ and a width $W_3$. In an embodiment, $L_3$ is in the range of ¼ wavelength and $W_3$ is in the range of 0.5 mm and 2 mm. Each pair of adjacent central openings 52 extend from a central point C and share an equal angle α to one another. The angle α may be substantially equal to 120 degrees.

Figure 12:
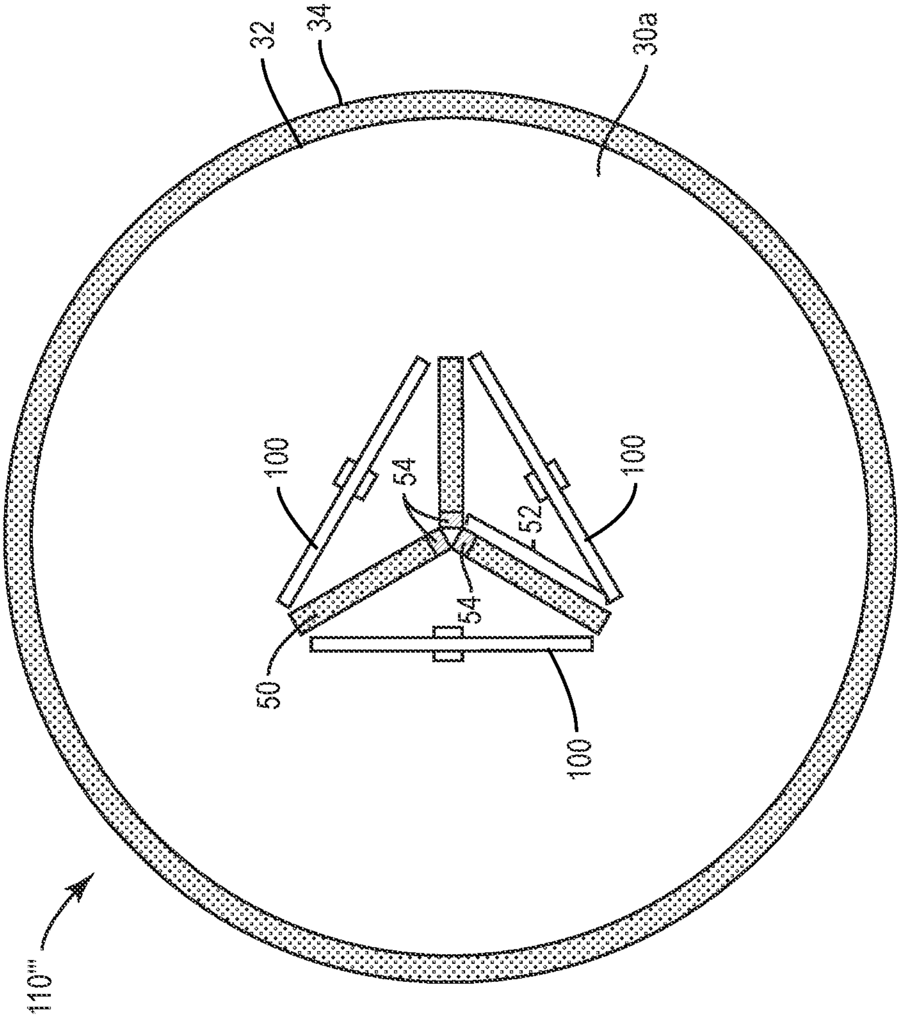
FIG. 12 illustrates an exemplary embodiment of an antenna module with capacitive loads forming part of a ground plane opening structure.

FIG. 12 shows an exemplarily embodiment of the antenna module 110" of FIG. 10 wherein the ground plane opening structure 50 further comprises three capacitive loads 54 each forming part of a first end of each respective one of the three central openings 52. The capacitive loads 54 may be replaced with at least one of variable reactive loads, a combination of active and reactive loads, and switches (not shown) coupled to the ground plane opening structure 50 to tune the ground plane opening structure 50 at an intended center frequency ω to further enhance isolation, reduce polarization mismatch losses, and/or minimize propagation delay distortions. According to an embodiment, the intended center frequency ω may correspond to a frequency or a central frequency at which the antenna module 110" transmits and/or receives signals using an ultra-wide band (UWB) wireless technology.

Figure 13:
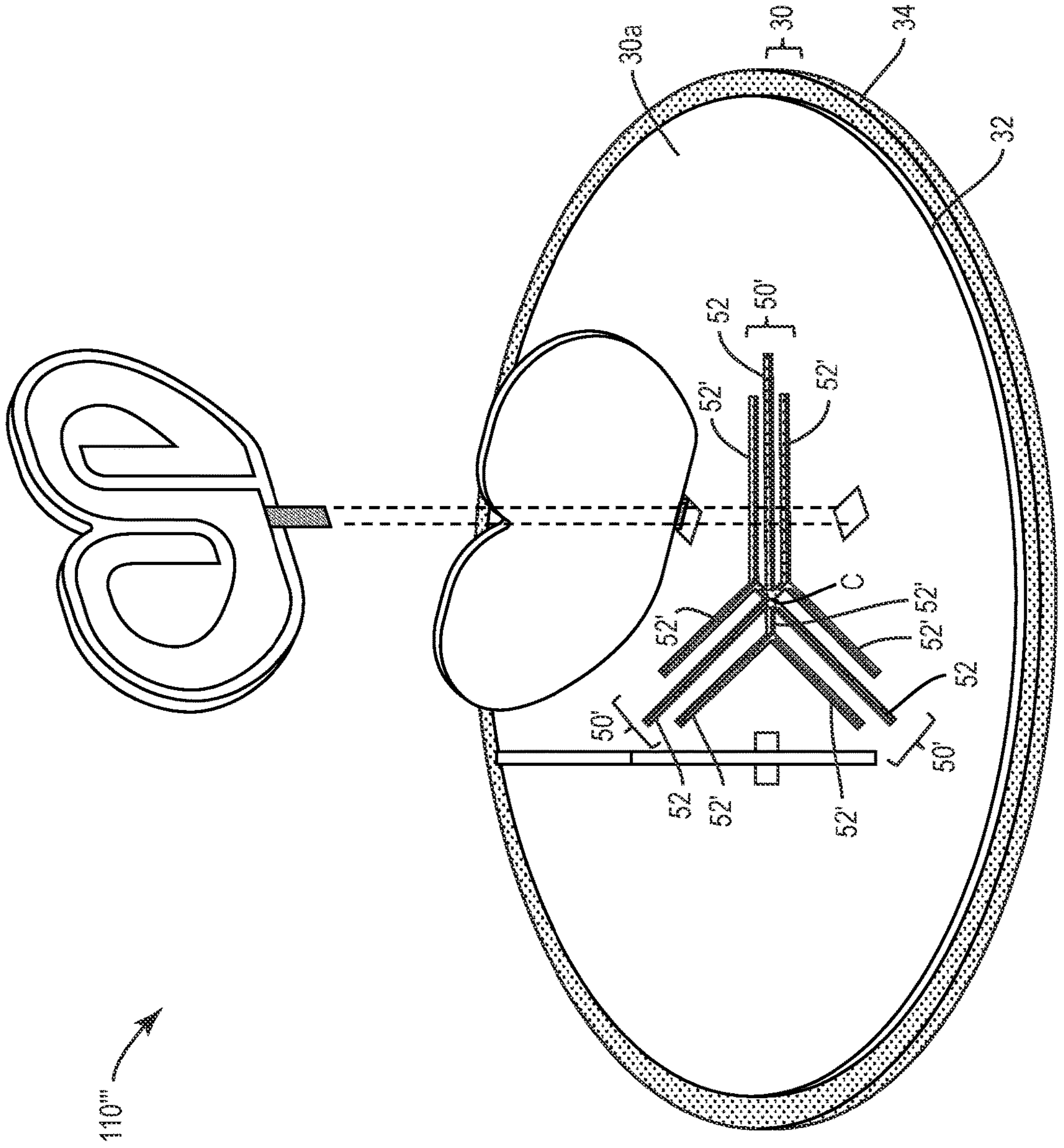
FIG. 13 illustrates an exemplary antenna module as shown in FIG. 10 further comprising additional ground plane openings forming part of a singular and unitary ground plane opening structure.

FIG. 13 illustrates an exemplary embodiment of the antenna module 110'" comprising additional sub-central openings 52' forming part of the singular and unitary ground plane opening structure 50'. According to an embodiment, the ground plane opening structure 50' as shown in FIG. 13 further comprises a plurality of additional sub-central openings 52' that extend parallel to the three central openings 52 as described in reference to FIG. 10.

Figure 14:
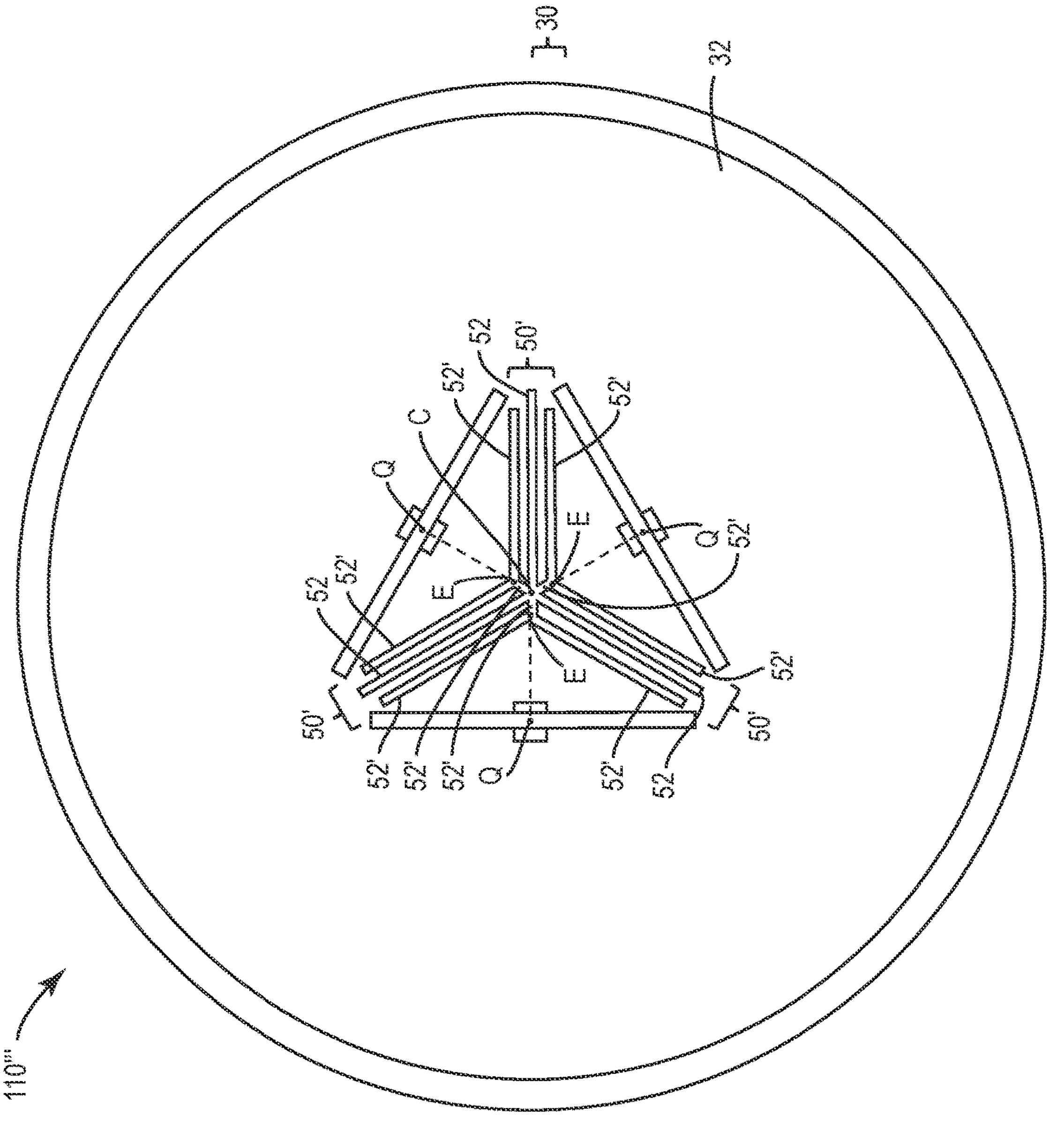
FIG. 14 is a top view of the antenna module of FIG. 13.

FIG. 14 illustrates a top view of the antenna module 110'" as previously shown in FIG. 13. The ground plane opening structure 50' comprises nine sub-central openings 52' and three central openings 52 as shown in FIG. 13. Three imaginary points E on the ground plane assembly 30 rest on one of three straight lines CQ extending in between the point C and each of the three points Q on the ground plane assembly 30. For each point E, three sub-central openings 52' extend outwardly and at equally distributed angles of 120 degrees to form additional openings in the ground plane 32. According to an embodiment, points E share a substantially equal distance from the central point C.

Sub-central openings 52' may extend radially outward at equally distributed angles from the point E wherein for each point E, two of the three sub-central openings 52' extend in parallel to their respective adjacent central openings 52 and one of the three sub-central opening 52' extends toward and connects to the central point C forming a unitary ground plane opening structure 50'.

The shape, dimensions, or a combination thereof each of a plurality of central openings 52 and the sub-central openings 52' may be adjusted to further tune the ground plane opening structure 50' to a desired center frequency to enhance isolation and correlation of signals at and around an intended center frequency ω. The intended center frequency ω may correspond to the frequency or center frequency of a frequency band at which the antenna module 110'" transmits and/or receives signals using an ultra-wide band (UWB) wireless technology. Hollow portions of the ground plane opening structure 50' is filled with a dielectric material having a dielectric constant c and configured to tune the operation of ground plane opening structure 50' optimally for a center frequency at which of antenna module's 110'" radiation.

Figure 15A:
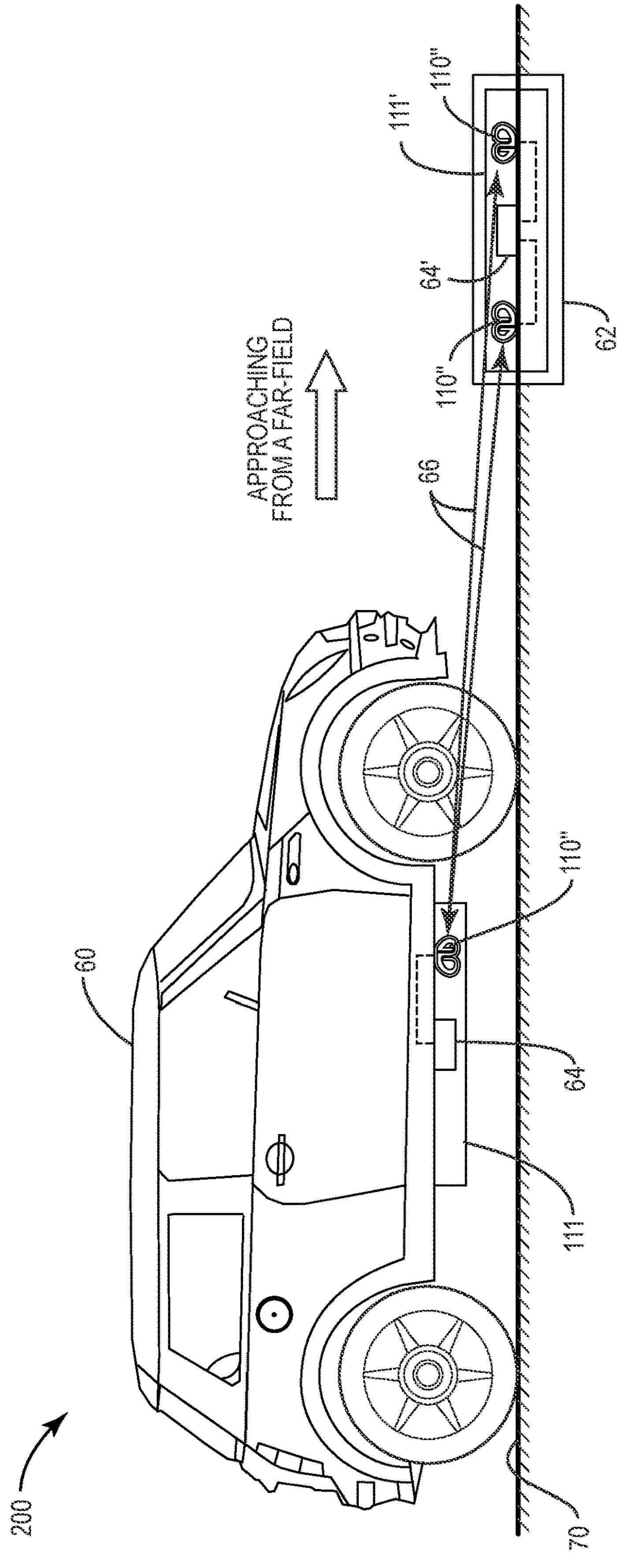
FIGS. 15A and 15B illustrate a wireless communication system having a first networking device mounted under a bottom surface of an electric vehicle and a second networking device mounted over a top surface of a ground-plane charging pad.
Figure 15B:
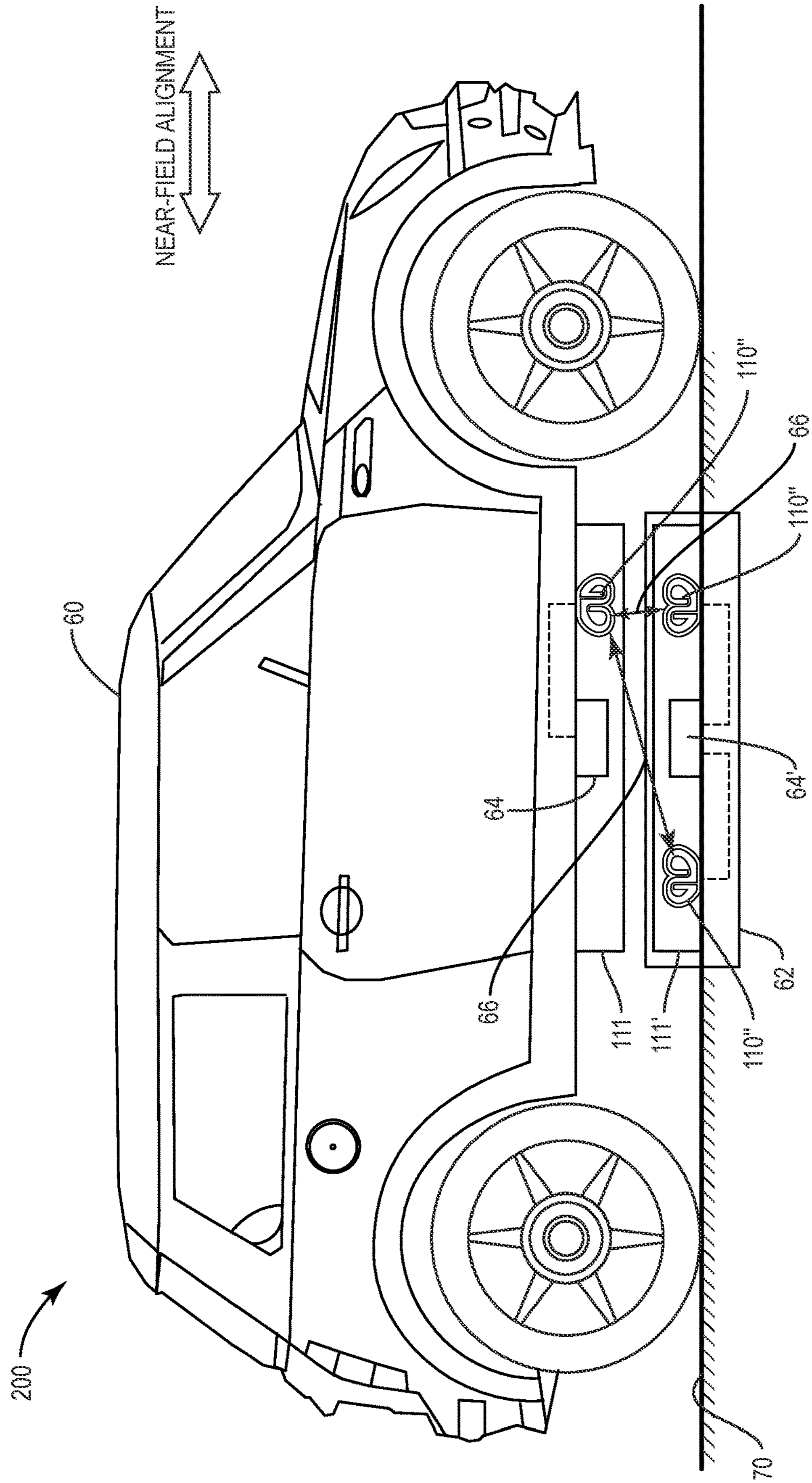

FIGS. 15A and 15B illustrate a wireless communication system 200 having a first networking device 111 mounted under a bottom surface of an electric vehicle 60 and a second networking device 111' mounted in and/or over a top surface 62*a* of a ground-plane charging pad 62. Each of the first networking device 111 and the second networking device 111' comprise one or more antenna modules 110" coupled to one of a first control unit 64 or a second control unit 64'.

The antenna modules 110" are substantially similar to the antenna module 110" as described in reference to FIGS. 10 to 14 and will continue to bear the same reference numerals as those discussed. The first networking device 111 and the second networking device 111' form the wireless communication system 200 configured to receive, process, and transmit an information signals 66 related to positioning, directing, and alignment of the electric vehicle 60 with respect to the ground-plane charging pad 62.

FIG. 15A illustrates a first of two scenarios according to which an electric vehicle 60 approaches a top surface of the ground-plane charging pad 62 from a far-field wherein a horizontal gap between one of a frontside or a backside of the electric vehicle 60 and the ground-plane charging pad 62 exists. According to an embodiment, during a far-field approach, radiation propagation is along a horizontal path above a ground surface 70. A second dominant polarization of the antenna modules 110" facilitates an alignment in a direction of dominant line of sight between the first networking device 111 and the second networking device 111' which further enhances the ultra-wide band wireless communication between the one or more antenna modules 110" of the first networking device 111 and the one or more antenna modules 110" of the second networking device 111".

The information signals 66 carry information data corresponding to a distance between the first networking device 111 and the second networking device 111', or a function related to that distance. In another embodiment, the information signals 66 may further carry information data corresponding to the angle between the first networking device 111 and the second networking device 111', or a function related to said angle.

Determining a position of the electric vehicle 60 with respect to the ground-plane charging pad 62 includes a determination of both a direction and a distance of the electric vehicle 60 to the ground-plane charging pad 62. Real time analysis and processing of the transmitted and/or received information signals 66 by the control unit 64 of the first networking device 111 and the control unit 64' of the second networking device 111' provides the electric vehicle 60 with information that enables the electric vehicle 60 to be directed towards the ground-plane charging pad 62.

FIG. 15B shows a second of two scenarios according to which the electric vehicle 60 may require to align itself accurately above a surface of the ground-plane charging pad 62. According to the second scenario, at least a portion of a bottom surface of the electric vehicle 60 and a portion of a top surface of the ground-plane charging pad 62 overlap vertically. A near-field approach and alignment requires an accurate positioning and alignment of the first networking device 111 of the electric vehicle 60 laterally and longitudinally above the second networking device 111' of the ground-plane charging pad 62.

The first networking device 111 and the second networking device 111' form the wireless communication system 200 to transmit and receive the information signals 66. According to an embodiment, the information signals 66 carry information data corresponding to a distance between the first networking device 111 and the second networking device 111', or a function related to that distance. The information signals 66 may further carry information data corresponding to the angle between the first networking device 111 and the second networking device 111', or a function related to said angle.

Real time analysis and processing of the transmitted and/or received information signals 66 by the control unit 64 of the first networking device 111 and the control unit 64' of the second networking device 111' enables the electric vehicle 60 to be directed towards the ground-plane charging pad 62 and to determine its lateral offset with respect to a top surface of the ground-plane charging pad 62.

Those skilled in the art will recognize improvements and modifications to the preferred embodiments of the present disclosure. All such improvements and modifications are considered within the scope of the concepts disclosed herein and the claims that follow.

What is claimed is:

1. An antenna assembly comprising:
an elongated central segment along a first axis, having a first end and a second end;
a first spiral segment comprising:
a first section that extends outward from the first end of the elongated central segment, the first section defining a first spiral curve;
a second section that extends from the first section back toward the second end; and
a third section that extends from the second section inward along the elongated central segment;
a second spiral segment comprising:
a fourth section that extends outward from the second end of the elongated central segment, the first section of the first spiral segment having greater curvature than the fourth section of the second spiral segment;
a fifth section that extends from the fourth section back toward the first end, the fifth section defining a second spiral curve and the second section of the first spiral segment having less curvature than the fifth section of the second spiral segment; and
a sixth section that extends from the fifth section inward along the elongated central segment; and
wherein each of the elongated central segment, the first spiral segment, and the second spiral segment are electrically conductive and form an antenna element.

2. The antenna assembly according to claim 1, wherein the elongated central segment, the first spiral segment, and the second spiral segment reside in a first plane.

3. The antenna assembly according to claim 2, wherein the first spiral segment and the second spiral segment are on opposite sides of the elongated central segment.

4. The antenna assembly according to claim 3, further comprising an antenna substrate on or in which the antenna element resides, wherein the antenna substrate comprises of a dielectric material.

5. The antenna assembly according to claim 4, further comprising a connection member connected to and extending from the elongated central segment, wherein the connection member is electrically conductive.

6. An antenna module comprising:
a ground plane assembly comprising a ground plane having a top surface and a bottom surface; and
a plurality of antenna assemblies disposed over the top surface of the ground plane, each of the plurality of antenna assemblies comprising:
an elongated central segment along a first axis having a first end and a second end;
a first spiral segment comprising:
a first section that extends outward from the first end of the elongated central segment, the first section defining a first spiral curve;
a second section that extends from the first section back toward the second end; and
a third section that extends from the second section inward along the elongated central segment;
a second spiral segment comprising:
a fourth section that extends outward from the second end of the elongated central segment, the first section of the first spiral segment having greater curvature than the fourth section of the second spiral segment;
a fifth section that extends from the fourth section back toward the first end, the fifth section defining a second spiral curve and the second section of the first spiral segment having less curvature than the fifth section of the second spiral segment; and
a sixth section that extends from the fifth section inward along the elongated central segment; and
wherein each of the elongated central segment, the first spiral segment, and the second spiral segment are electrically conductive and form an antenna element.

7. The antenna module according to claim 6, further comprising a plurality of openings in the ground plane, wherein each of the plurality of openings is an elongated opening having a first end and a second end, and wherein the plurality of central openings form part of a ground plane opening structure.

8. The antenna module according to claim 7, wherein the plurality of antenna assemblies comprise three antenna assemblies disposed radially at equal distances and equally distributed angles equal to 120 degrees around a point on the ground plane assembly.

9. The antenna module according to claim 8, wherein the ground plane assembly is circular and wherein the point on the ground plane assembly is a central point of the ground plane assembly.

10. The antenna module according to claim 9, wherein the plurality of openings comprise three central openings extending radially outward at equal lengths and equally distributed angles equal to 120 degrees from the central point of the ground plane assembly, each of the three central openings having the first end intersecting at the central point and the second end extending in between adjacent pairs of the plurality of antenna assemblies, forming a “Y” shape in the ground plane.

11. The antenna module according to claim 10, wherein the plurality of openings further comprise six sub-central openings so that the six sub-central openings and the three central openings are nine elongated openings, wherein each three of the nine elongated openings extend radially outward at equally distributed angles equal to 120 degrees from a point on a bisector, the bisector extending and intersecting the central point at an angle.

12. The antenna module according to claim 10, wherein the ground plane opening structure further comprises three outer openings, wherein each of the three outer openings is the elongated opening in the ground plane, each of the three outer openings extending in a direction that is parallel to a horizontal direction of extension of a different one of the three antenna assemblies and is perpendicular to another direction of extension of a different one of the three central openings.

13. The antenna module according to claim 10, wherein the ground plane opening structure further comprises one or more loads coupled to the ground plane opening structure.

14. The antenna module according to claim 10, wherein each of the plurality of antenna assemblies are the same as one another.

15. The antenna module according to claim 14, wherein each of the plurality of antenna assemblies are substantially perpendicular to the ground plane assembly.

16. The antenna module according to claim 15, further comprising an antenna substrate on or in which the antenna element resides, wherein the antenna substrate comprises of a dielectric material.

17. The antenna module according to claim 16, wherein the ground plane assembly further comprises a ground plane substrate on or in which the ground plane resides.

18. The antenna module according to claim 17, wherein the ground plane substrate forms part of a bottom surface of the ground plane opening structure.

19. The antenna module according to claim 18, wherein the first spiral segment and the second spiral segment are on opposite sides of the elongated central segment.

20. The antenna module according to claim 19, wherein the elongated central segment, the first spiral segment, and the second spiral segment reside in a first plane.

21. The antenna module according to claim 20, wherein the ground plane assembly further comprises a plurality of thru holes.

22. The antenna module according to claim 21, wherein each of the three antenna assemblies further comprise a connection member connected to and extending from the elongated central segment, wherein the connection member is electrically conductive and is inserted into a different respective thru hole of the plurality of thru holes.

23. The antenna module according to claim 22, wherein the ground plane assembly is planar and resides in a second plane.

24. The antenna module according to claim 23, wherein an operating frequency of the antenna module is in a range between 5 to 20 GHz.

25. A wireless communication system comprising:
a control unit;
an antenna module associated with the control unit comprising:
a ground plane assembly comprising a ground plane having a top surface and a bottom surface; and
a plurality of antenna assemblies disposed over the top surface of the ground plane, each of the plurality of antenna assemblies comprising:
an elongated central segment along a first axis having a first end and a second end;
a first spiral segment comprising:
a first section that extends outward from the first end of the elongated central segment, the first section defining a first spiral curve;
a second section that extends from the first section back toward the second end; and
a third section that extends from the second section inward along the elongated central segment;
a second spiral segment comprising:
a fourth section that extends outward from the second end of the elongated central segment, the first section of the first spiral segment having greater curvature than the fourth section of the second spiral segment;
a fifth section that extends from the fourth section back toward the first end, the fifth section defining a second spiral curve and the second section of the first spiral segment having less curvature than the fifth section of the second spiral segment; and
a sixth section that extends from the fifth section inward along the elongated central segment; and
wherein each of the elongated central segment, the first spiral segment, and the second spiral segment are electrically conductive and form an antenna element.

* * * * *